2,711,415
PREPARATION OF AMIDES

Delmer L. Cottle, Highland Park, and David W. Young, Westfield, N. J., assignors to Esso Research and Engineering Company, a corporation of Delaware No Drawing. Application March 22, 1952,
Serial No. 278,114

7 Claims. (Cl. 260—404)

This invention relates to a novel process for preparing amides. More particularly, it relates to the utilization of boric acid as a catalyst for the preparation of these amides.

Amides have been prepared in general by reacting amines with carboxylic acids. A particular class of amides, i. e., acyl p-aminophenols, have been finding ever-increasing utility as anti-oxidants for relatively non-volatile organic materials which normally tend to deteriorate in storage due to undesirable oxidation reactions (e. g., see application Serial No. 185,326, filed September 16, 1950, now U. S. Patent 2,654,722, granted on October 6, 1953).

These particular acyl p-aminophenols were prepared by a reaction which comprised heating a monocarboxylic acid with the aminophenol in the presence of a water entraining organic solvent, such as benzene, toluene, or xylene, with para-aminophenol.

The above method of preparation of the amides suffers from certain disadvantages. For example, p-aminophenol, an intermediate in the preparation of dyes, is difficult to obtain in a white and pure form. The products of the reaction consequently also are colored. The products also are further colored by undesirable degradation reactions which take place during the course of the rather long reaction. The obtaining of a colored product is completely undesirable in view of the fact that the anti-oxidants find extensive use in clear resins and plastics which cannot tolerate colored additives.

It has now been found that boric acid is an extremely effective catalyst for the preparation of preferably water-insoluble amides and thus eliminates many of the before-mentioned difficulties.

The process of this invention thus comprises heating an amine with an organic acid, preferably a carboxylic acid, in the presence of the boric acid catalyst.

It is especially surprising to learn that boric acid is such an effective catalyst for these particular type reactions in view of the fact that it does not work in reactions where other acid catalysts are used, e. g., in the preparation of a simple ester, an acetal, an olefin from an alcohol, or an unsaturated alcohol from a glycol. On the other hand, other catalysts, including acid catalysts conventionally known in the art, do not catalyze the amide reaction of this invention. Typical of the catalysts which do not work are sulfuric acid, acetic acid, sodium bisulfate, sodium stearate, zinc stearate and ammonium chloride.

The reaction for the preparation of the amides is conducted in the same manner as is detailed above except for the addition of the boric acid to the reaction system. Boric acid is utilized in an amount of up to about 5 weight per cent based on the combined weight of the reactants and entrainer, and preferably in an amount of 1 to 2 weight per cent.

Thus the amide compounds are prepared, for example, in the case of acyl p-aminophenols by heating the carboxylic acid with the amine in the presence of a water entraining solvent such as benzene, toluene, or xylene, with p-aminophenol, using the expressed amounts of boric acid. The amide product is then dried by evaporation and obtained in relatively pure form. Water washing or washing with aqueous alkaline solutions further purifies the product and removes any traces of boric acid contained therein. The boric acid is thus removed by utilizing its preferential water solubility or salt forming tendency. The acyl p-aminophenols can also be recrystallized from isopropyl alcohol. The products are free of boric acid and from any deleterious effects due to its use.

The amides prepared by the process of this invention are, as is well known, compounds derived from carboxylic acids by the replacement of the OH group by $NH_2$. The process is also particularly applicable to the preparation of substituted amides, e. g., those in which the nitrogen is also linked to an aromatic nucleus such as acyl p-aminophenols. The aromatic nucleus in turn can be further substituted.

The acids particularly preferred for utilization in the reaction of this invention are the monocarboxylic acids having from 2 to 21 carbon atoms. Typical acids are thus butyric ($C_4$); caproic ($C_6$); caprylic ($C_8$); capric ($C_{10}$); lauric ($C_{12}$); myristic ($C_{14}$); palmitic ($C_{16}$); stearic ($C_{18}$); undecylenic ($C_{11}$=); oleic ($C_{18}$=); linoleic ($C_{19}$=); benzoic; cyclohexylvaleric ($C_{11}$); cyclohexylcaproic; $C_8$ oxo acids; $C_9$ oxo acids; $C_{13}$ oxo acids; naphthenic acids; and the rosin acids.

The amines utilized to prepare the water-insoluble amides can be aliphatic or aromatic. The aliphatic amines, which can be primary or secondary, preferably contain no more than 50 carbon atoms and include amines such as 3,3'-iminobispropylamine

methylamine, dimethylamine, ethylamine, diethylamine, n-propylamine, di-n-propylamine, n-butylamine, n-amylamine, n-hexylamine, laurylamine, ethanolamine, and diethanolamine. Among the aromatic amines that can be used are aniline, methylaniline, o-toluidine, m-toluidine, p-toluidine, o-nitroaniline, m-nitroaniline, p-nitroaniline, o-anisidine, p-anisidine, p-phenetidine, p-aminothiophenol and diphenylamine. The aromatic amines which are particularly suitable and preferred for utilization in this invention are p-aminophenol and its alkylated derivatives.

Polycarboxylic acids may also be converted to amides using boric acid as a catalyst.

The following examples illustrate this invention and the preparation of the indicated compounds.

EXAMPLE I

N-stearoyl-p-aminophenol was prepared from the reaction of stearic acid with p-aminophenol in three experiments. The experiments utilized exactly the same conditions, except that one contained no catalyst and the other two experiments contained one and two weight per cent boric acid respectively. N-lauroyl-p-aminophenol was similarly prepared in two controlled experiments, one without boric acid and another with two weight per cent boric acid. The results are presented below:

*Effect of boric acid on preparation of N-lauroyl and N-stearoyl-p-aminophenol*

| Weight percent of Boric Acid | Mole Percent Yield of N-Lauroyl-p-aminophenol in 2 Hours at 140° C. | Mole Percent of Yield of N-Stearoyl-p-aminophenol in 3 Hours at 143° C. |
|---|---|---|
| 0 | | 44 |
| 1 | 11 | 69 |
| 2 | 54 | 79 |

These examples demonstrate how 57% and 79% greater yields of the stearoyl derivative and 390% greater yield of the lauroyl derivative were obtained through the utilization of the boric acid catalyst. This decrease in time also is instrumental in improving the color of the product. The two stearic acid preparations catalyzed by boric acid gave white final products, whereas the control gave a colored gray product, although all three preparations had the same melting point, 125°–127° C.

EXAMPLE II

An acyl derivative of 3-pentadecyl-4-aminophenol was prepared by refluxing a 9 mole per cent excess of $C_{13}$ oxo acids with the aminophenol in the presence of toluene as a water entrainer and 0.5 weight per cent boric acid as a catalyst. A 94 mole per cent yield of the N-tridecanoyl-3-pentadecyl-4-aminophenol resulted in 7 hours at 145°–151° C. liquid temperature.

EXAMPLE III

A tristearoyl derivative of 3,3'-iminobispropylamine was prepared by heating the amine at 145°–152° C. with a 3 mole ratio of stearic acid in the presence of toluene as a water entrainer and 0.2 weight per cent boric acid. In 4.5 hours the yield of the amide was 95 mole per cent. When no boric acid was used, the time required to obtain a 95% yield was seven hours.

EXAMPLE IV 125 grams of para-amino thio phenol were reacted with 200 grams of lauric acid. 100 grams of toluene were used as solvent and water entrainer. Heat was added and the temperature was held around 130°–145° C. Four grams of boric acid were added as catalyst at the start of the reaction. An 89% yield of N-lauroyl para-amino thio phenol was obtained in four hours.

Boric acid also has utility in the preparation of some particular complex esters such as one prepared from 1 mole of 1,3-butanediol, 2 moles of adipic acid, and 2 moles of "isooctyl alcohol." Under otherwise comparable conditions the yield of this complex ester was 66 mole per cent without boric acid catalysis, 78 mole per cent with 1 weight per cent sodium acid sulfate as catalyst, and 83 mole per cent with 1 weight per cent boric acid. The boric acid preparation appears to have improved stability.

The advantages of the process of this invention reside in the fact that the reaction time is reduced considerably and with it product degradation. White products free of undesirable colors are obtained. Boric acid is both cheap and readily available.

It is to be understood that the invention is not limited to the specific examples, which have been offered merely as illustrations, and that modifications may be made without departing from the spirit of this invention.

What is claimed is:

1. In a process for preparing carboxylic amides by condensation of an organic monocarboxylic acid of 2 to 21 carbon atoms with an amine selected from the group consisting of primary and secondary amino derivatives of aliphatic hydrocarbons, aromatic hydrocarbons, phenols and thiophenols, the improvement which comprises carrying out the condensation reaction in the presence of boric acid as a catalyst.

2. In a process for the preparation of an N-acyl p-aminophenol which comprises reacting p-aminophenol with an aliphatic saturated monocarboxylic acid of 12 to 18 carbon atoms, the improvement which comprises carrying out the condensation reaction in the presence of boric acid as a catalyst.

3. The process of claim 2 in which the reaction is carried out utilizing a water entraining organic solvent.

4. The process of claim 3 in which the boric acid is present in an amount of about 1 to 2 weight per cent based on the total weight of the reactants and diluents.

5. The process as in claim 4 in which the acyl p-aminophenol prepared is N-lauroyl p-aminophenol and in which the catalyst consists of boric acid.

6. The process as in claim 4 in which the acyl p-aminophenol prepared is N-stearoyl p-aminophenol.

7. The process of claim 1 in which the amide prepared is the tristearoyl derivative of 3,3'-iminobispropylamine.

References Cited in the file of this patent

UNITED STATES PATENTS

| | | |
|---|---|---|
| 2,013,108 | Reppe et al. | Sept. 3, 1935 |
| 2,606,915 | Garbo | Aug. 12, 1952 |